April 14, 1925.
T. A. BOTH
1,533,690
ELECTRIC RECEPTACLE
Filed April 24, 1920
2 Sheets-Sheet 1
Fig. 1
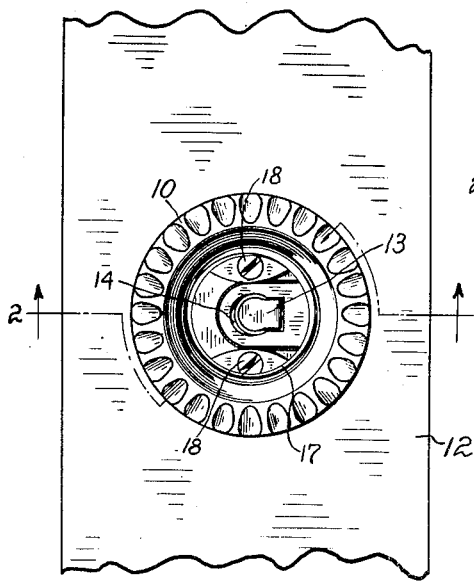
Fig. 2
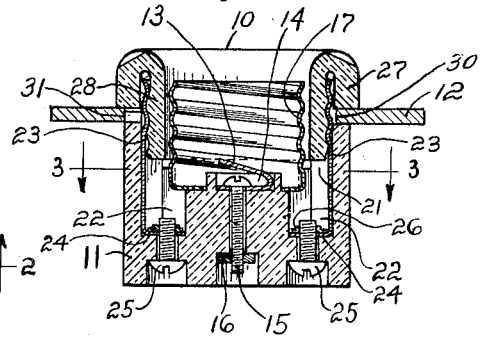
Fig. 3
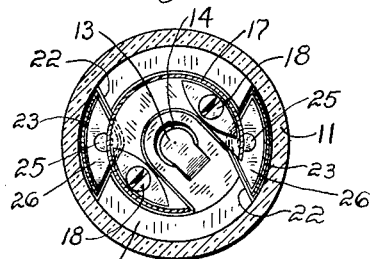
Fig. 5
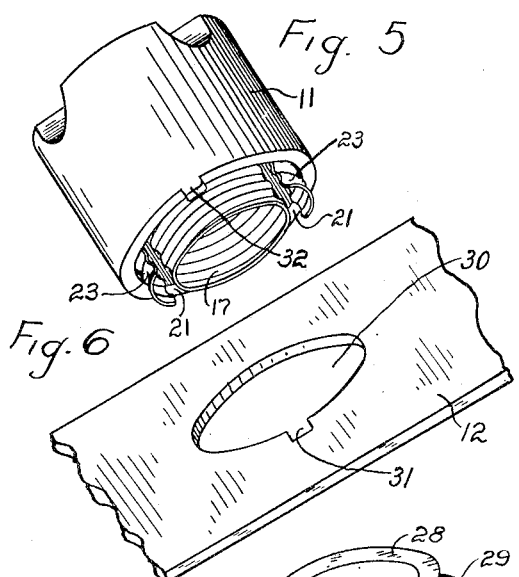
Fig. 6
Fig. 4
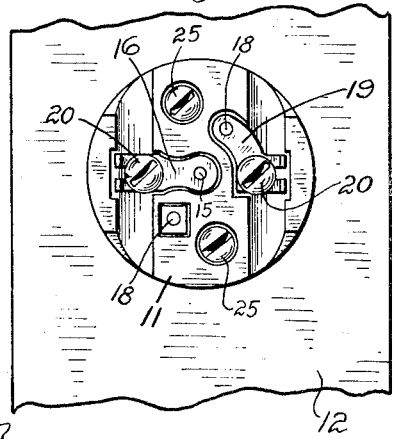
Fig. 7
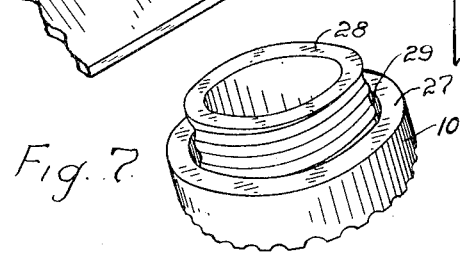
INVENTOR
Tonjes A. Both
BY
Wooster V Braddock
ATTORNEYS April 14, 1925.
T. A. BOTH
1,533,690
ELECTRIC RECEPTACLE
Filed April 24, 1920
2 Sheets-Sheet 2
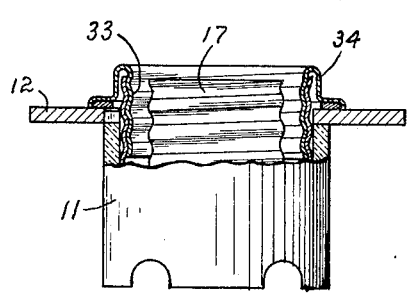
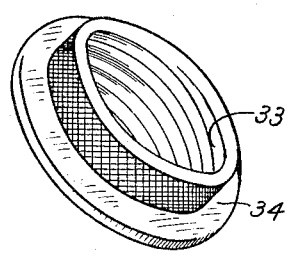
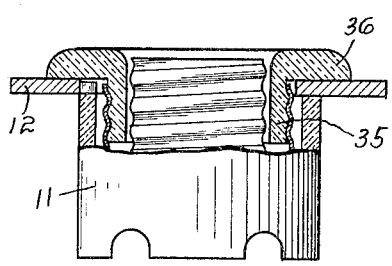
INVENTOR
Tonjes A. Both
BY
Wooster V Braddock
ATTORNEYS Patented Apr. 14, 1925.

1,533,690

UNITED STATES PATENT OFFICE.

TONJES A. BOTH, OF STRATFORD, CONNECTICUT, ASSIGNOR TO THE CONNECTICUT ELECTRIC MANUFACTURING COMPANY, OF BRIDGEPORT, CONNECTICUT, A CORPORATION OF CONNECTICUT.

ELECTRIC RECEPTACLE.

Application filed April 24, 1920. Serial No. 376,290.

*To all whom it may concern:*

Be it known that I, TONJES A. BOTH, a citizen of the United States, residing at Stratford, county of Fairfield, State of Connecticut, have invented an Improvement in Electric Receptacles, of which the following is a specification.

This invention relates to receptacles for electric lamps and has for its object to produce a novel receptacle particularly suitable for use in connection with electric signs, ceiling fixtures, and conduit boxes.

The invention will be hereinafter fully described in connection with the showing of the accompanying drawings forming a part of this specification.

In the drawings—

Fig. 1 is a front elevation of the novel receptacle, as when clamped in position on a support;

Fig. 2 a sectional view on line 2—2 in Fig. 1;

Fig. 3 a sectional view on line 3—3 in Fig. 2;

Fig. 4 a rear elevation of the structure of Fig. 1;

Figs. 5, 6 and 7 show, respectively, the body of the receptacle, a fragment of a support, and the cap of the receptacle, in disassembled relation;

Fig. 8 a side elevation, partly in section, of a modified form of the invention;

Fig. 9 a perspective view of the metal cap of the receptacle of Fig. 8; and

Fig. 10 is a side elevation, partly in section, of another modified form.

Referring now to Figs. 1 to 7, inclusive, 10 denotes the clamping ring or cap and 11 the body of the improved electric receptacle, and 12 denotes a fragment of material which may constitute an electric display sign sheet, a ceiling fixture, a fixture over a conduit box, or the like.

The body of the receptacle is constructed of porcelain, or other insulating material. The cap need not be of insulating material. The contacts, which are carried by the body, may be incorporated in any suitable manner. As shown, there is a center contact 13 which is held in position, within a concavity 14 formed in the material of the body, by a headed screw 15 whose lower end is adapted to have threaded engagement with wire terminal plate 16 to hold said plate in position on the bottom of the body. There is a threaded shell 17, forming the socket for the lamp and constituting the side contact, which surrounds the center contact and is fastened to the body in any approved manner. As shown, the threaded shell is fastened by securing screws 18 one of which has threaded engagement with wire terminal plate 19 to hold said plate in position. 20 denotes binding screws for the terminals of the connecting wires. Preferably, portions of the bottom of the body are cut away, as shown, to provide depressions for receiving the wire terminal plates and the necessary screws. The cut away portions may be plugged with insulating cement or with wax to conceal the plates and screws.

The diameter of the body of the receptacle is considerably greater than the diameter of the threaded shell, thus providing an annular space 21 between said body and shell. As shown in Figs. 2 and 3, diametrically opposite portions of the body, which lie beneath annular space 21 and the threaded shell, are removed, as indicated at 22, to provide passage for spring engaging members 23, the configuration of which will be apparent from Figs. 2, 3 and 5. The spring engaging members are provided with attaching flanges 24 at their inner ends and are secured to the body by means of screws 25 which pass through the attaching flanges and engage retaining plates 26. The outer portions of the spring engaging members are threaded and extend beyond the open end of the body, as more clearly shown in Figs. 2 and 5. It will be apparent that the spring engaging members need not be insulated for the reason that they are spaced from the threaded shell.

The cap may be constructed as clearly shown in Fig. 2, having a circular flange portion 27, an externally threaded, depending portion 28, the threads preferably extending to the top of the depending portion, and a circular groove 29 between the flange and depending portions. As disclosed in Fig. 2, the inner diameter of the depending portion of the cap is greater than the outer diameter of the threaded shell. The external threads on said depending portion are adapted to have engagement with the threaded portions of the spring engaging members and the outer ends of the spring engaging members are adapted to enter the circular groove.

The support is provided with a circular opening 30 of suitable diameter to receive the outer ends of the spring engaging members and of less diameter than the diameter of the body of the receptacle. In order to locate the receptacle in the support, I provide notch 31 in the support, and lug 32 on the body, the lug being adapted to engage the notch.

To assemble the parts of the receptacle disclosed in Figs 1 to 7, all that is necessary is to position the body of the receptacle so that lug 32 engages notch 31 and the spring engaging members extend through opening 30, and to then insert the cap. The cap may be screwed into the spring engaging members, or it may be pushed into them until their outer ends pass into the circular groove, or until the depending portion of the cap enters the body, and then screwed in until the circular flange portion of the cap and the open end of the body are seated against opposite surfaces of the support, as disclosed in Fig. 2. So long as the outer ends of the spring engaging members are beyond the circular groove in the cap, and the depending portion of the cap is outside of the body, said outer ends may be easily sprung from each other, but as soon as said ends enter the circular groove, they are effectually held from springing by the circular flange portion of the cap. When the cap is screwed into the body until the sign sheet, or the like, is firmly grasped, the parts of the receptacle will be securely fastened to each other. To remove the cap, it may be unscrewed until the outer ends of the spring engaging members pass beyond the circular groove and then pulled from said members, as will be obvious.

As before suggested, the cap of the receptacle of Figs. 1 to 7 may be composed of metal for the reason that the threaded engaging members are spaced from the contacts.

Figs. 8 and 9 disclose a variant form of cap which may be of metal as it is shown, or of some insulating material. The cap of these figures has a threaded, depending portion 33 and a circular flange portion 34, but there is no circular groove which will assist in holding the cap and body to each other. This cap is inserted into the body in the same manner as is the cap of Figs. 1 to 7. It may be pushed in until its lower edge enters the body and then screwed in until the cap and body engage the support as before. The upper portion of the body insures the position of the threaded engaging members so that the cap is securely held to the body.

In Fig. 10 the threaded engaging members are shown spaced from the body of the receptacle, as well as from the threaded shell. In using this form of the invention, the opening in the support is made of just sufficient size to receive the threaded engaging members, so that when the depending portion of the cap is inserted the threaded engaging members will be held in proper position by the support, as will be readily understood. In the figure last mentioned the cap is of insulating material and comprises a threaded depending portion 35 and a flat flange portion 36 which is adapted to engage the support. It will of course be apparent that the form of body disclosed in Fig. 10 may be used in connection with any of the forms of cap shown and described.

What I claim is:—

1. An electric receptacle comprising an insulating body member provided with a recess leading from one side thereof, lamp contacts including a screw shell mounted in said recess, said body member being also provided with spaced recesses on opposite sides of said shell, threaded securing elements mounted in said recesses and extending longitudinally of said shell, and a clamping ring provided with a laterally extending flange for clamping a plate to the body member and also provided with an externally threaded substantially cylindrical body portion between the shell and the securing elements and having threaded engagement with said elements to secure the ring to the body member.

2. An electric receptacle comprising an insulating body member provided with a recess leading from one side thereof, lamp contacts including a screw shell mounted in said recess, a threaded securing element also mounted in said recess and extending longitudinally of said shell, and a clamping ring provided with a flange for clamping a plate to said body member and provided with an externally threaded substantially cylindrical body portion extending between the shell and the securing element and having threaded engagement with said element to secure the ring to the body member.

3. An electric receptacle comprising an insulating body member provided with a recess leading from one side thereof, lamp contacts including a screw shell mounted in said recess, said body member being also provided with spaced recesses on opposite sides of said shell, threaded spring elements mounted in said latter recesses, and extending longitudinally of said shell, and a clamping ring provided with a flange for clamping a plate to the body member and a substantially cylindrical externally threaded body portion spaced inwardly from said flange to provide an annular groove, said threaded body portion extending between the shell and the threaded spring elements and having threaded engagement with said elements to secure the ring to the body member, and the ends of said elements extending into said groove to hold the elements in engagement with the body portion.

In testimony whereof I affix my signature.

TONJES A. BOTH.